United States Patent [19]
Leibinger

[11] 3,828,432
[45] Aug. 13, 1974

[54] SHEAR CONSTRUCTION

[75] Inventor: Berthold Leibinger, Gerlingen, Germany

[73] Assignee: Firma Trumpf & Co., Ditzingen, Germany

[22] Filed: Mar. 5, 1973

[21] Appl. No.: 337,852

[30] Foreign Application Priority Data
Mar. 11, 1972  Germany....................... 2211898

[52] U.S. Cl................................... 30/241, 30/346
[51] Int. Cl............................................ B26b 15/00
[58] Field of Search ............ 30/228, 241, 242, 243, 30/346, 351, 357; 83/697, 679, 694, 926 H

[56] References Cited
UNITED STATES PATENTS
| | | | |
|---|---|---|---|
| 2,047,483 | 7/1936 | McArdle.............................. | 30/228 |
| 2,454,728 | 11/1948 | White .............................. | 30/228 X |
| 3,421,218 | 1/1969 | Thompson............................ | 30/228 |

*Primary Examiner*—Al Lawrence Smith
*Assistant Examiner*—J. C. Peters
*Attorney, Agent, or Firm*—McGlew and Tuttle

[57] ABSTRACT

A shear, particularly a portable shear, includes a first reciprocating blade and a second fixed blade which is mounted alongside the path of movement of the first blade for cooperative shearing operation therewith. Each blade comprises a block-like member having a plurality of separately oriented cutting edges disposed at angles to each other and the mounting means for each blade is such that the blades may be adjusted so as to present a selected cutting edge in an operative position.

5 Claims, 5 Drawing Figures

PATENTED AUG 13 1974　　3,828,432
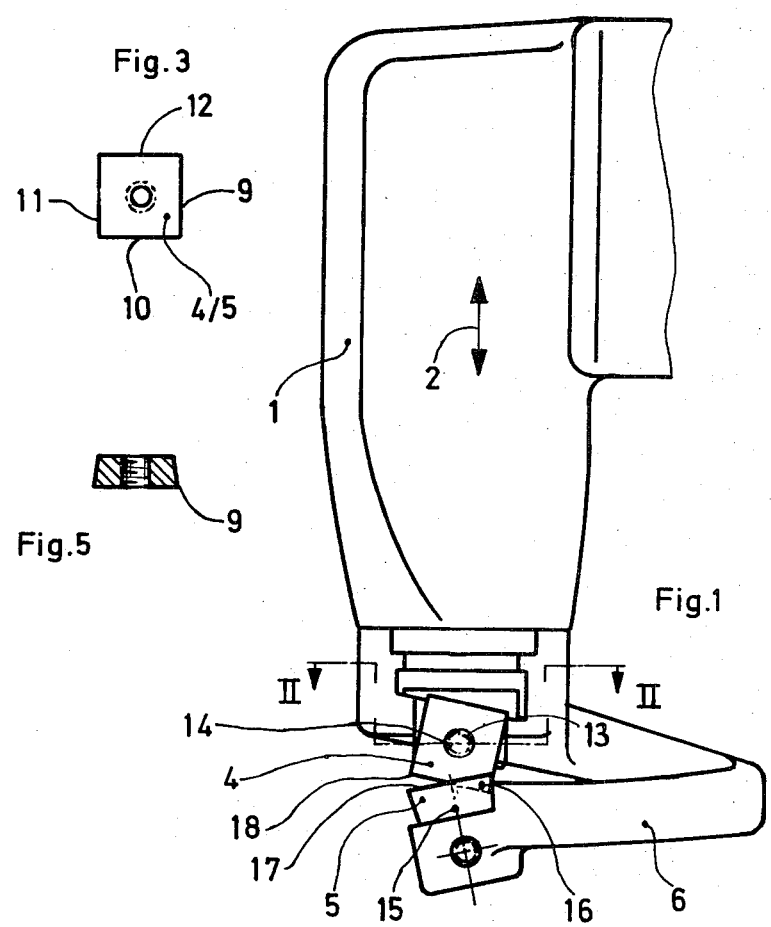
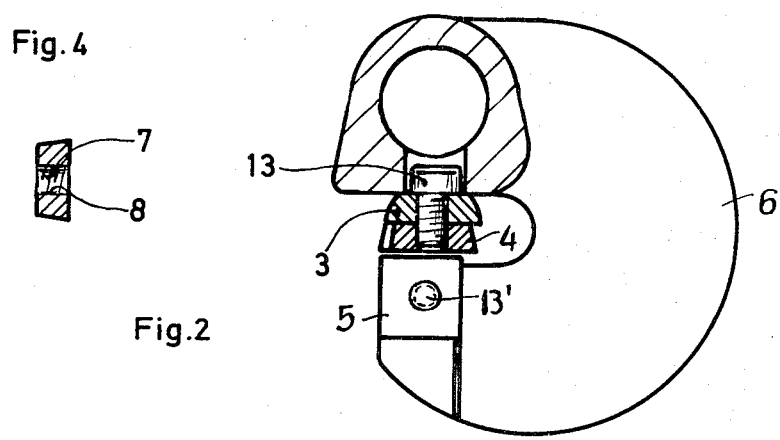

SHEAR CONSTRUCTION

BACKGROUND OF THE INVENTION

1. FIELD OF THE INVENTION

This invention relates in general to the construction of shears and, in particular, to a new and useful shear particularly of the portable type which includes a reciprocating cutting blade which moves in cooperation with a fixed cutting blade to effect the shearing action and wherein the blades are constructed with many cutting edges which may be selectively oriented in an operative position.

2. DESCRIPTION OF THE PRIOR ART

At the present time shears are known which include cutting blades which have more than one cutting edge so that every time a cutting edge becomes blunt, it can be replaced in a very short time by a new sharp cutting edge simply by turning the cutting blade. However, in such a shear construction the counter-blade has only one cutting edge and it must either be replaced by a new blade when the reciprocating blade moves into a new operating position or it must be reground. Generally, only the movable blade is brought into a new cutting position, and the counter-blade is left unchanged and this naturally does not lead to a fully satisfactory cutting operation in the future.

SUMMARY OF THE INVENTION

The present invention provides a shear which includes a movable blade and a fixed blade both of which may be shifted so that a new cutting edge may be brought into position every time the cutting power is reduced because of worn-out blades. For this purpose the invention provides a cutting blade and a counter-blade or fixed blade which is in the form of a block member having many edges, for example, particularly a square block having edges forming cutting blade edges. As soon as one edge becomes blunt, the securing means for both blades may be loosened to permit the blades to be turned to a new position to present a new cutting edge in an operative location. Each blade is then secured again in the new position so that the old cutting power is restored to the device in no time at all. When all of the cutting edges become blunt, the blades may be easily replaced by new ones. Regrinding and adjustment of the reground blades is thus completely eliminated. The invention has the advantage that both blades have the correct correlation to each other and thus the cutting result therefore does not depend on the quality of an adjustment operation.

In accordance with another aspect of the invention, both the movable blade and the fixed counter-blade have the same form and, in particular, they are made of a plate-shaped configuration and are fastened by a securing bolt which extends through a central bore thereof. By making both blades of the same shape, it is possible to double the number of parts which are produced in mass production and thus, the production costs are reduced. If necessary the securing bore may be threaded to permit the anchoring of the blade in an operative position.

In a preferred embodiment of the invention, the axes for fastening the two blades extend at an angle of 90° to each other in an arrangement, for example, in which one plate lays flat while the other is upright. At the same time the cooperating blades form an angle with each other. However, since only about half of the cutting edge works in each case, and is subsequently worn-out during operation, the number of available blades can be increased in a very advantageous manner by interchanging the top oriented blade with the bottom oriented blade. Both blades preferably have straight cutting edges and they are advantageously made in the form of a truncated pyramid. In addition, the plate can have a constant cross section at an end extending over a narrow range.

In accordance with another important embodiment of the invention, in the upper dead center position of the reciprocating plunger of the machine which carries the movable blade, approximately the centers of the two blade edges are correlated with each other. Consequently, only the respective overlapping part of the cutting edge works. The rear cutting edge halves seen in the direction of the shear, thus do not have to take part in the cutting process. This means that with a square plate, for example, there would be not only four but eight possible operating positions. The blades can be turned through angles of 360° in effecting their repositioning for operation and in addition, they may be interchanged.

Accordingly, it is an object of the invention, to provide a shear which includes a movable and a fixed blade each of which comprise block-like elements having a plurality of separately oriented cutting edges disposed at angles to each other and which are mounted in a manner which permits them to be exchanged and positioned so as to present a selected cutting edge in an operative orientation.

A further object of the invention is to provide a shear which is simple in design, rugged in construction and economical to manufacture.

For an understanding of the principles of the invention, reference is made to the following description of typical embodiments thereof as illustrated in the accompanying drawing.

BRIEF DESCRIPTION OF THE DRAWINGS

In the Drawings:

FIG. 1 is a partial side elevational view of a shear constructed in accordance with the invention;

FIG. 2 is a section taken along the line II—II of FIG 1;

FIG. 3 is a top plan view of the blade constructed in accordance with the invention;

FIG. 4 is a longitudinal sectional view of the blade shown in FIG. 3; and

FIG. 5 is a transverse sectional view of the blade shown in FIG. 3.

GENERAL DESCRIPTION OF THE PREFERRED EMBODIMENTS

Referring to the drawings in particular, the invention embodied therein comprises a portable shear which includes a driving head 1 having a drive motor which reciprocates a plunger 3 shown in FIG. 2 in order to cause it to move upwardly and downwardly in the direction of the double arrow 2 shown in FIG. 1. A cutting blade 4 is rigidly connected with the plunger 3 and therefore performs in an ascending and descending movement also. The cutting blade 4 comprises a movable cutting blade which cooperates with a second or stationary counter-blade 5 which is affixed in position on the free end of a worm-shaped cutting table 6.

In accordance with the invention, the first blade 4 and the second blade 5 are advantageously of identical form, namely the form of a truncated pyramid having a central hole or bore 8 which is advantageously provided with a thread 7 for the fastening of the plunger in position on either the plunger 3 or the cutting table 6. Each blade 4 and 5 has four cutting edges 9, 10, 11 and 12 as shown in FIG. 3. As soon as a pair of blades become blunt, the mounting means for the blades is such that they may be loosened by unfastening a fastening screw 13 for the movable blade 4 and 13′ for the movable blade 5 and each blade turned to its next operating position. After the usage proceeds to the point where all of the cutting edges become dull, the blades may be replaced by new blades.

As seen in FIG. 1 the axis 14 of the first cutting blade 4 extends at an angle of 90° to the axis 15 of the second cutting blade 5. In the operative position, for example, the cutting blade 4 is secured in an upright position while the counter-blade 5 lays flat on the cutting table 6. In the position of the blades indicated in the drawings, the movable blade 4 is at the lower end of its position of travel and in such position there is only a small area 16 of overlap of the two blades. This means that only the areas of the blades which are facing are worn during cutting operation and this area is located to the rear of the blade in each case. The comparable forward areas 17 and 18 of the blades do not take part in the cutting process. Therefore, if the blunt blade is turned three times and brought into a new operating position each time, its cutting life is used up only to the extent of one-half of its full time. If the upper blade is then interchanged with the lower blade, both can again be brought into four separate operative positions, so that eight pairs of cutting edges are available in the embodiment of the cutting blades 4 and 5 which are illustrated.

While specific embodiments of the invention have been shown and described in detail to illustrate the application of the principles of the invention, it will be understood that the invention may be embodied otherwise without departing from such principles.

What is claimed is:

1. A shear, particularly a portable shear, comprising a first reciprocating blade, a second fixed blade, first mounting means mounting said first blade for reciprocating movement, second mounting means mounting said second blade in a fixed position closely alongside the movement path of said first blade for cooperative shearing operation with said first blade, each blade comprising a block-like member having a plurality of separately oriented cutting edges disposed at angles to each other, said first and second mounting means permitting the adjustable positioning of said first and second blades for the orientation of selected cutting edges in operative positions, said first and second blades having straight cutting edges and being in the form of a truncated pyramid.

2. A shear, according to claim 1, wherein said blades are of substantially the same form and each is provided with a central hole therethrough, said mounting means comprising a bolt extending through the hole to secure said blade in position.

3. A shear, according to claim 1, wherein said first and second mounting means mount said first and second blades so that their mounting axes are substantially 90° apart.

4. A shear, according to claim 1, wherein said first and second mounting means and said first and second blades are such that said first and second blades overlap each other in the lower dead center position of movement of said first blade, the overlapping being approximately to the center of said first and second blades.

5. A shear, particularly a portable shear, comprising a first reciprocating blade, a second fixed blade, first mounting means mounting said first blade for reciprocating movement, second mounting mrand mounting said second blade in a fixed position closely alongside the movement path of said first blade for cooperative shearing operation with said first blade, each blade comprising a block-like member having a plurality of separately oriented cutting edges disposed at angles to each other, said first and second mounting means permitting the adjustable positioning of said first and second blades for the orientation of selected cutting edges in operative positions, said first mounting means comprising a plunger, a frame head guiding said plunger for vertical upward and downward movement, said first blade comprising a truncated pyramid having a bore therethrough, a bolt extending through the bore of said first blade and holding said first blade to said plunger with said first blade positioned in an upright position, said second mounting means comprising a mounting arm located below said plunger and having an upwardly facing mounting base, said second blade being mounted on said upwardly facing mounting base and being in the form of a truncated pyramid with a bore extending therethrough, a second bolt extending through the bore of said second cutting blade and into said mounting base and holding said second blade in a flat substantially horizontally extending position.

* * * * *